Patented June 23, 1953

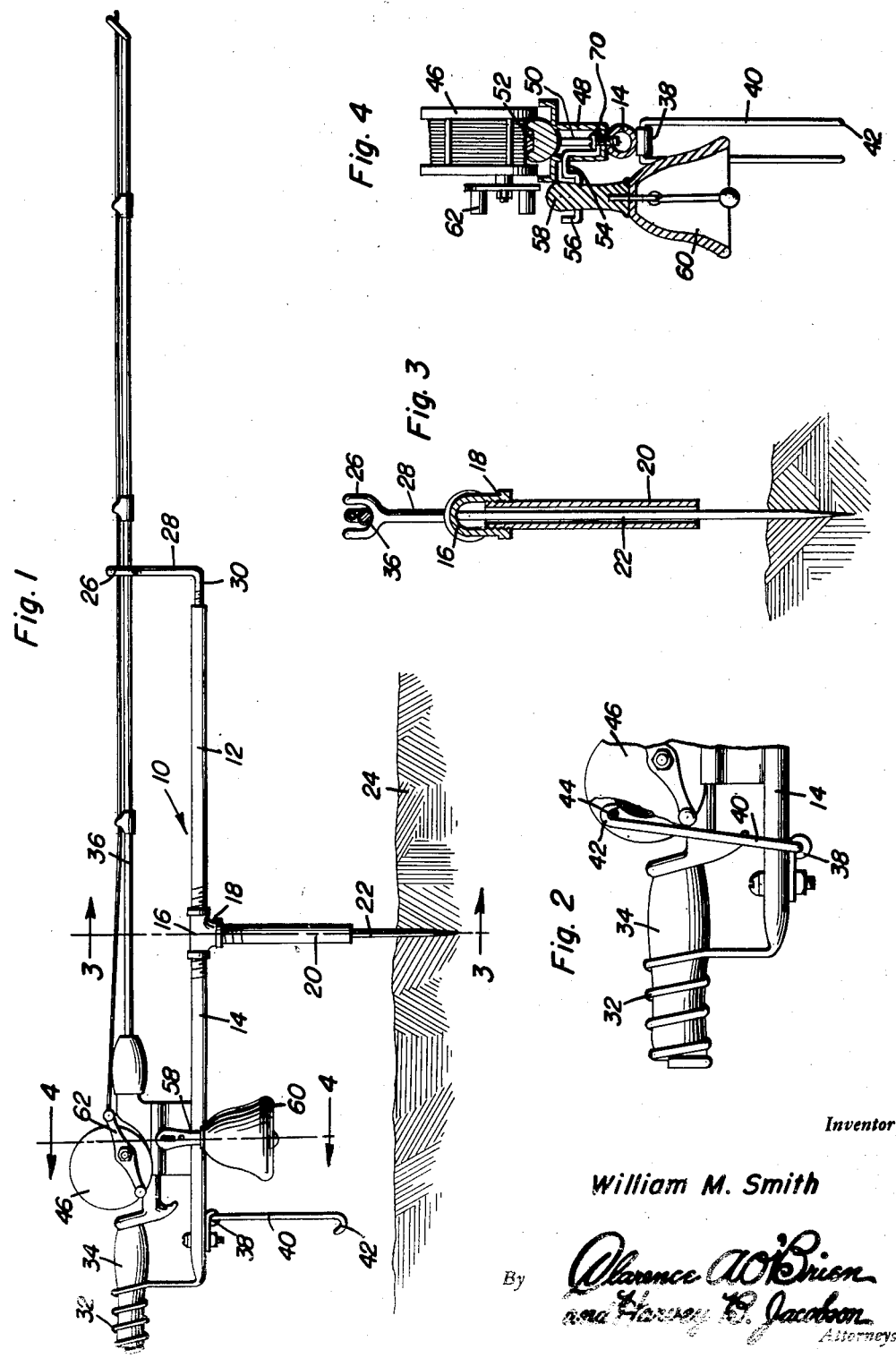

2,642,692

UNITED STATES PATENT OFFICE 2,642,692

AUTOMATIC FISHING POLE RACK

William M. Smith, Cincinnati, Ohio

Application April 24, 1950, Serial No. 157,763

4 Claims. (Cl. 43—17)

This invention relates to new and useful improvements in fishing pole racks and the primary object of the present invention is to provide a fishing pole rack embodying a novel and improved signal device that is actuated as the reel on a fishing pole is unwound to indicate to a user that a fish has been hooked on the line.

Another important object of the present invention is to provide a fishing pole rack that is mounted for horizontal rotation so that as a fish pulls on the line carried by the pole supported on the present rack, the rack can swing without effecting a breakage or bending of the pole.

A further object of the present invention is to provide a fishing pole rack so constructed as to permit a fishing pole to be quickly and readily applied thereto or removed therefrom in a convenient manner.

A still further aim of the present invention is to provide a fishing pole rack that is simple and practical in construction, strong and reliable in use, neat and attractive in appearance, small and compact in structure, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the present invention in use;

Figure 2 is an enlarged detail view of Figure 1 and showing the manner in which the handle of the fishing pole is held and also the pivotal locking member engaged with the reel to prevent movement of the reel and pole with respect to the rack;

Figure 3 is a transverse vertical sectional view taken substantially on the plane of section line 3—3 of Figure 1; and Figure 4 is a transverse vertical sectional view taken substantially on the plane of section line 4—4 of Figure 1.

Referring now to the drawings in detail, wherein for the purpose of illustration, there is disclosed a preferred embodiment of the present invention, the numeral 10 represents an elongated member including a forward section 12 and a rear section 14. The sections 12 and 14 are tubular and their inner ends are externally threaded to receivably engage the horizontal portion 16 of a T-fitting. The vertical portion 18 of the T-fitting receivably engages the threaded upper end of a further tubular section 20.

The lower end of a supporting post or upright 22 is embedded in the ground 24 and the upper portion of the post 22 extends into the tubular section 20. The upper end of the post 22 bears against the inner periphery of the horizontal portion 16 and will permit rotation of the elongated member 10 about the supporting post 22 as a pivot.

A forked member 26 is associated with the tubular section 12 and the forked member includes a shank portion 28 having a laterally projecting externally threaded arm 30 that receivably engages the internally threaded open forward end of the tubular section 12.

Suitably secured to the rear end of the tubular section 14 is a spiral spring that is spaced parallel to the elongated member 10. This spring 32 yieldingly grips the handle portion 34 of a fishing pole 36 that is supported by the forked member 26.

Hinged to the lower periphery of the section 14, as at 38, is the web portion of a substantially U-shaped retaining member 40. The ends of the member 40 are turned outwardly to provide hooks 42 that will engage a cross bar 44 of a fishing reel 46 that is held on the pole 36 or more particularly the handle portion 34 of the pole 36. When the hooks 42 are engaged about the cross bar 44, the fishing pole 36 will be held against sliding movement relative to the elongated member 10.

The web portion of an elongated channel member or support 48 is detachably secured to the upper periphery of the tubular section 14 and the upper edges of the channel member 48 are turned outwardly and upwardly so that the same will not interfere with the rotation of the reel 46. A support 50 rises from the web of the channel member 48 and is secured to the attaching flange 52 of the reel 46.

One of the leg portions of the channel member 48 is provided with an aperture that receives a wire member 54. The inner eye end of the wire member 54 is detachably secured to the web portion of the channel 48 and to the tubular section 14 by a screw 70 and the outer end portion of the wire member 54 is provided with a horizontally disposed channel shaped portion 56 that is received in an aperture in the handle 58 of a bell or sound alarm 60. It should be noted that the handle portion 58 is disposed relatively close to the reel 46 so that as the handle 62 of the reel rotates it will contact the handle portion 58 of the bell 60 thereby imparting a swinging movement to the bell 60 to sound an alarm.

In practical use of the present invention, the post 22 is inserted in the ground and the tubular extension 20 is slipped over the post 22 as aforementioned so that the rack and more particularly the members 12 and 14 can rotate in a horizontal plane. The handle 34 of the fishing pole is then inserted into the spiral wire member 32 and the forward portion of the pole 36 is supported on the fork 26. The hooks 42 are placed over the cross bar 44 and the device is now assembled for use. As a fish pulls on the line elongated member 10 can swing horizontally and as the line is played out the arm 62 of the reel will engage the handle portion 58 of the bell 60 to sound an alarm.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is shown and described a preferred embodiment of the invention the same is susceptible to certain changes fully comprehended by the spirit of the invention as herein described and the scope of the appended claims.

Having described the invention, what I claim as new is:

1. For use with a fishing pole having a reel mounted thereon and a handle, a rack for the pole, said rack comprising an elongated member having a laterally projecting central portion, a supporting post received in said central portion and supporting the member for rotation, means at one end of said member supporting the forward portion of the pole, means at the other end of said member for receiving and holding the handle of the pole, means carried by the member engaging the reel to prevent sliding movement of the reel relative to the member, and a signal bell mounted on the member and disposed relative to the reel whereby a rotation of the reel will cause the reel handle to contact the bell to sound an alarm, said first-mentioned means including a fork member having a shank portion and a threaded arm projecting laterally from the shank portion, said member having a threaded opening at one end receivably engaging said arm.

2. For use with a fishing pole having a reel mounted thereon and a handle, a rack for the pole, said rack comprising an elongated member having a laterally projecting central portion, a supporting post received in said central portion and supporting the member for rotation, means at one end of said member supporting the forward portion of the pole, means at the other end of said member for receiving and holding the handle of the pole, means carried by the member engaging the reel to prevent sliding movement of the reel relative to the member, and a signal bell mounted on the member and disposed relative to the reel whereby a rotation of the reel will cause the reel handle to contact the bell to sound an alarm, said means for receiving and holding the handle of the pole including a spiral spring that is spaced above and parallel to the member.

3. For use with a fishing pole having a reel mounted thereon and a handle, a rack for the pole, said rack comprising an elongated member having a laterally projecting central portion, a supporting post received in said central portion and supporting the member for rotation, means at one end of said member supporting the forward portion of the pole, means at the other end of said member for receiving and holding the handle of the pole, means carried by the member engaging the reel to prevent sliding movement of the reel relative to the member, and a signal bell mounted on the member and disposed relative to the reel whereby a rotation of the reel will cause the reel handle to contact the bell to sound an alarm, said member including a pair of tubular sections having threaded inner ends, a T-fitting including a horizontal portion receiving the inner ends of said tubular sections and a vertical portion receiving the laterally projecting central portion, said post having an upper end resting against the inner periphery of said horizontal portion.

4. In combination with a fishing pole and reel, and a rack for the pole, a signal attachment comprising a crank arm, a bell having a handle supported on the crank arm and mounted to be contacted by the reel handle during rotation of the reel handle, and a substantially U-shaped member pivotally mounted on the rack and having terminal hooks for engaging the reel to hold the reel relative to the bell handle whereby the reel handle will engage the bell handle.

WILLIAM M. SMITH.

References Cited in the file of this patent

UNITED STATES PATENTS

| Number | Name | Date |
|---|---|---|
| 87,188 | Monnier | Feb. 23, 1869 |
| 399,588 | Washburn | Mar. 12, 1889 |
| 1,330,314 | Gott et al. | Feb. 10, 1920 |
| 1,523,223 | Leonardos | Jan. 13, 1925 |
| 1,534,642 | Hoagland | Apr. 21, 1925 |
| 1,626,333 | Fain et al. | Apr. 26, 1927 |
| 2,158,104 | Bowen | May 16, 1939 |
| 2,184,583 | Danko | Dec. 26, 1939 |
| 2,311,823 | Gaskill | Feb. 23, 1943 |
| 2,314,747 | White | Mar. 23, 1943 |
| 2,430,112 | Hamre | Nov. 4, 1947 |
| 2,454,458 | Kaetker | Nov. 23, 1948 |
| 2,481,881 | Schneider | Sept. 13, 1949 |